United States Patent [19]

Konrad et al.

[11] 3,995,204
[45] Nov. 30, 1976

[54] BRAKING MODE CONTROL FOR AN ELECTRIC TRACTION MOTOR

[75] Inventors: Charles Edward Konrad; Joe Chester Lambert, both of Roanoke, Va.

[73] Assignee: General Electric Company, New York, N.Y.

[22] Filed: Dec. 20, 1974

[21] Appl. No.: 534,881

[52] U.S. Cl. .............................. 318/367; 318/373
[51] Int. Cl.² .......................................... H02P 3/12
[58] Field of Search .......................... 318/363–367, 318/373

[56] References Cited
UNITED STATES PATENTS

| | | | |
|---|---|---|---|
| 3,365,642 | 1/1968 | Risberg | 318/367 X |
| 3,828,235 | 8/1974 | Price et al. | 318/373 |
| 3,869,653 | 3/1975 | Masuzawa et al. | 318/364 |

*Primary Examiner*—Robert K. Schaefer
*Assistant Examiner*—W. E. Duncanson, Jr.
*Attorney, Agent, or Firm*—Walter C. Bernkopf; James H. Beusse

[57] ABSTRACT

A control system for a DC electric traction motor which eliminates cogging of the motor during transition from a driving to a plugging mode. The system incorporates apparatus for comparing motor armature current to a plugging current reference voltage which voltage is initially applied as a ramp function to thereby provide a smooth transition into braking.

5 Claims, 1 Drawing Figure

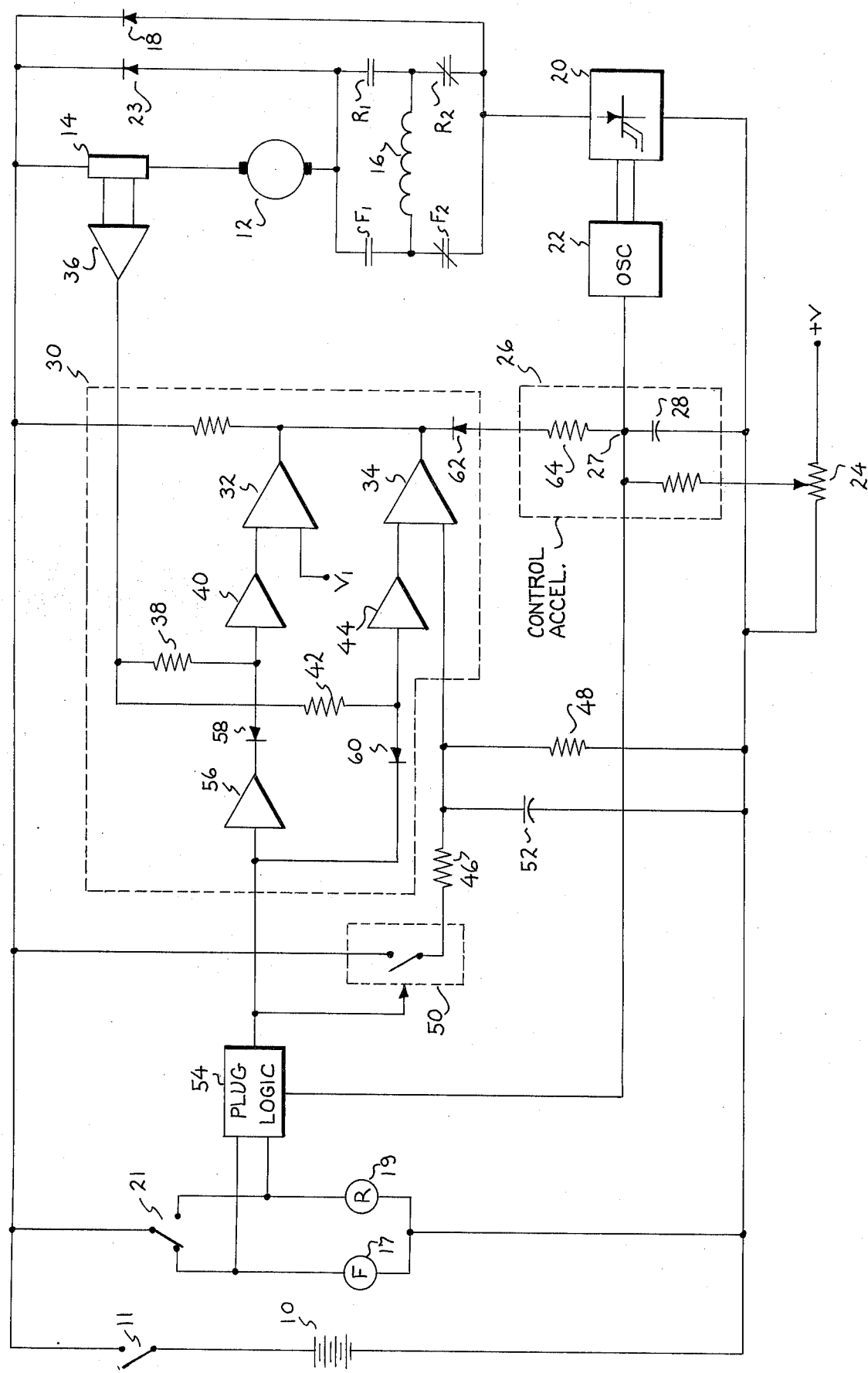

BRAKING MODE CONTROL FOR AN ELECTRIC TRACTION MOTOR

BACKGROUND OF THE INVENTION

The present invention relates to control systems for DC electric powered vehicles and more particularly to a control system including a plug current limit circuit.

In DC electric powered vehicles, it is common practice to employ the drive motor to brake the vehicle by reversing the direction of torque of the motor. This type of braking is known as dynamic braking or plugging. Electric industrial vehicles are presently designed such that when running at full speed, a direction selector may be moved to select an opposite direction without releasing the accelerator. In such vehicles an electric control circuit overrides the accelerator demand and provides a substantially constant level of braking torque until the motor speed has dropped to near zero.

Prior art control systems regulated braking torque by maintaining a constant level of field flux or by maintaining a constant level of armature current. Both of these methods have known defects, a typical example of which is an effect called "cogging". Cogging is recognizable as one or more bumps or lurches of the vehicle which normally occur toward the end of the braking interval as a result of variations in braking torque. It has been found that cogging is much more pronounced when the vehicle is switched into a braking mode at a low rather than a high speed. It has also been found that cogging is more pronounced in those vehicles using electric motors with a high $K_v$ motor constant, which motors produce more counter EMF per ampere of field current. Prior art attempts to aleviate cogging by selection of motors having low $K_v$ motor constants have been inefficient and ineffectual. Other attempts to reduce cogging by providing controlled acceleration have proven impractical because excessive response times produce sluggish operation of the vehicle.

We have found that the prior art attempts to prevent cogging have been unsuccessful primarily because the prior art has failed to recognize the true cause of the problem. By experimentation and analysis, we have found that cogging is an instability or oscillation in the control circuit which is directly associated with the increased torque per ampere of field current as the motor speed decreases. For example, at a very high speed, very little field flux is required to produce the required level of armature current and therefore since the torque is proportional to the product of armature current and field flux the net torque is small. As the speed decreases, an increasing amount of field flux is required to maintain the desired armature current; therefore, the torque per ampere of armature current increases and intensifies the torque variations with decreasing speed.

The torque variations result from the control system being underdamped, so that switching into a current limit mode produces an initial overshoot oscillation and, at low speeds where the torque per ampere is high, these oscillators can be felt cogging. This oscillation or ringing when the armature current is suddenly stepped is greater and more pronounced in terms of motor torque at low speeds than it is in the higher speed regions. The overall performance of a control system with the characteristics which produce this overshoot is desirable in order to prevent sluggish vehicle performance. Consequently, we have found that the best solution is to reduce the effects of the overshoot rather than alter the control system constants.

It is an object of the present invention to provide a control system which overcomes the cogging effect.

It is a further object of the present invention to provide a control system which overcomes the cogging effect without sacrificing system response.

SUMMARY OF THE INVENTION

In accordance with the present invention, the foregoing and other objects of the invention are achieved by implementation of a variable reference current limit in a feedback control system. In a preferred embodiment, a reference current limit which is normally applied as a step function is processed through an integrator in order to produce substantially a ramp function. Comparison of motor armature current to a gradual increasing reference current limit produces a substantially uniform error signal and avoids overshoot of armature current.

BRIEF DESCRIPTION OF THE DRAWING

For a better understanding of the present invention, reference may be had to the accompanying drawing in which:

FIG. 1 is a basic power circuit for a battery powered electric vehicle control incorporating the apparatus of the present invention.

DESCRIPTION OF THE PREFERRED EMBODIMENT

FIG. 1 discloses, in schematic form, certain elements of a typical pulse control circuit adapted for use with a DC motor. A source of DC potential, here shown as a battery 10, is coupled to one side of an armature 12 of a DC motor 13 by means of a switch 11 and a resistive shunt 14. The illustrated motor is of a series wound type and includes a field winding 16 coupled in series with the armature and a flyback diode 18 connected in parallel with motor 13. Contacts F1, F2, R1 and R2 are arranged to connect winding 16 in series with armature 12 in a manner to produce either forward or reverse torque. Contacts F1, F2 and R1, R2 are controlled respectively by contactor coils 17 and 19, which coils are energized by means of a direction control switch 21. The power circuit is completed by means of a thyristor switch, herein represented as SCR 20. The amount of the voltage produced by battery 10 which effectively appears across the terminals of motor 13 is a function of the average rate of conductivity, or mark-space ratio, of thyristor 20. By varying the mark-space ratio, the effective voltage across the terminals of the motor may be varied from zero to practically 100% of the available battery voltage. Each time the thyristor is gated into conduction, a pulse of current flows from the battery 10 through motor 13 and thyristor 20. Upon commutation of the thyristor, due to the inductive nature of the motor, current continues to flow through the motor by virtue of the presence of flyback diode 18. Current flow through the closed loop comprising the armature 12 and field windings 16 of motor 13 and diode 18 is thus related to but dissimilar from the magnitude of current flow through the overall power circuit. A plugging diode 23 connected in parallel with armature 12 provides a bypass path for armature current during dynamic braking.

In order to operate thyristor 20 at the proper intervals, a gating control 22 is provided. For ease of illustration, thyristor 20 is represented as having a pair of gate leads, one for energizing and the other for commutating the thyristor. In practice, a separate commutation circuit is commonly provided for the thyristor and may be any one of several types. One successfully used commutation circuit is disclosed in U.S. Pat. No. 3,777,237, Anderson, issued Dec. 4, 1973, and assigned to the assignee of the present invention. Commonly, such a circuit will include a capacitor which is charged in a first direction preparatory to commutation of the thyristor. The charge upon the capacitor is then reversed and the reverse voltage thus accumulated is coupled across the terminals of thyristor 20 for back biasing the thyristor, causing current to cease flowing therethrough and affecting the extinguishment or commutation of the thyristor.

A speed control 24, shown herein as a potentiometer provides an adjustable voltage which is ultimately used to regulate the operation of gating control 22. Interposed between speed control 24 and gating control 22 is a controlled acceleration circuit 26 indicated schematically as a summing junction 27 and filter capacitor 28. Controlled acceleration circuits are often provided in electrical control systems in order to limit the rate of change of a control voltage applied to a gating control in order to preclude precipitous changes in the conductivity of thyristor 20.

In addition to the speed control signal from speed control 24, a second current limit signal is supplied from a current limit circuit 30 herein illlustrated schematically as a pair of comparators 32 and 34 each of which includes a first input terminal connected to receive a signal representative of the amplitude of current flowing in armature 12. The signal representing armature current is provided by a differential amplifier 36 having a pair of input terminals connected respectively to opposite ends of resistive shunt 14. An output terminal of amplifier 36 is connected by means of a resistor 38 and an inverter 40 to the first input terminal of comparator 32 and by means of a resistor 42 and an inverter 44 to the first input terminal of comparator 34. A second input terminal of comparator 32 is connected to receive a reference voltage from a reference voltage source (not shown). A second input terminal of comparator 34 is connected to receive a reference voltage from a voltage source indicated as a voltage divider network connected in parallel with battery 10. Although indicated as a voltage divider network comprising a pair of resistors 46 and 48, it is to be understood that in practice it may be desirable to supply the reference voltage to comparator 34 from a more stable voltage source. Although circuit 30 is illustrated as comprising two comparators it will be obvious that a single comparator could be used with appropriate gating circuits to control the respective reference voltages or in an application wherein a single reference voltage level is to be utilized.

A switch 50 is arranged to connect one terminal of resistor 46 to the positive side of battery 10 when it is desired to provide a reference voltage to comparator 34. Switch 50 may be any of a number of types of switches well known in the art which are responsive to an input signal for providing a signal flow path, such as, for example, a reed relay or a transistor switch. A capacitor 52 connected in parallel with resistor 48 forms an integrating network such that the voltage applied to the second input terminal of comparator 34 will appear as a ramp function rather than as a step function. Alternately, the step input voltage from switch 50 could be applied to a solid state integrator such as, for example, an operational amplifier with capacitor feedback, if it were desired to provide a more linear ramp function as a reference voltage to comparator 34.

The determination of whether comparator 32 or comparator 34 will provide a plug limit signal to control acceleration circuit 26 is controlled by plug logic circuit 54. Plug logic circuit 54 monitors the status of contactor coils 15 and 16 and also the voltage level at summing junction 27 and outputs a plug current limit signal when it is determined that the motor 13 is in a plugging or dynamic braking mode. Such a plug logic circuit is shown in copending application of R. C. Clark, Ser. No. 525,296, filing date Nov. 20, 1974 and assigned to the assignee of the present invention; however, it is to be understood that the plug logic circuit is merely one form of a plug sensing circuit and any plug sensing circuit capable of determining when the motor 13 is in a plugging mode and outputting a signal representative thereof could be substituted for plug logic circuit 54.

In order to control whether comparator 32 or comparator 34 is to be utilized to set a current limit, the output signal from plug logic circuit 54 is applied via an inverter 56 to a cathode of a diode 58 and is also applied to a cathode of a diode 60. For the embodiment illustrated, plugging of motor 13 is indicated by a high level signal out of plug logic circuit 54, which signal back biases diode 60 and allows the current reference signal from amplifier 36 to be applied through resistor 42 and inverter 44 as an input signal to comparator 34. At the same time, the high level signal is inverted by inverter 56 and pulls down the cathode of diode 58 to a low level, which low level is inverted by inverter 40 and applied as a high level signal to comparator 32 thereby forcing the output of comparator 32 to a high level. The particular construction and arrangement of comparators 32 and 34 is such that the output signal from current limit circuit 30 will be responsive to that comparator producing the lowest level output voltage. This current reference signal will be applied through diode 62 and resistor 64 to summing junction 27 and will thus control the level to which summing junction 27 can be charged thereby controlling the mark-space ratio of thyristor 20.

In operation, with contactor 17 energized and the motor running in the forward direction, current will flow from the battery left-to-right, through armature 12 and field winding 16 thereby providing a generated armature voltage positive to the top brush of the armature. During the period in which thyristor 20 is open, the energy stored in the motor inductance provides the voltage necessary to circulate current through the armature 12, field winding 16 and from anode to cathode in diode 18 thereby maintaining continuity of motor current during the interpulse period. When switch 21 is positioned to remove power from contactor coil 17 and energize contactor coil 19 while the motor is still running in the forward direction, the top brush will no longer be positive but rather the bottom brush will be made positive by the generated counter EMF and this polarity of voltage will be short-circuited by diode 23 such that until the motor has come to a stop or the field connections reversed, the generated counter EMF is short-circuited by the power diode 23. A current will therefore circulate from the bottom brush of the armature up through diode 23 and back into the top brush of the armature. The product of this current and whatever field flux is required in the machine to generate the counter EMF will produce the braking effort. While diode 23 is conducting current the bottom brush of the armature is essentially at battery positive voltage since the forward voltage drop across diode 23 is very small. Therefore, thyristor 20 has a capability of connecting and disconnecting the motor field 16 directly across the battery so that, in effect, the motor is operated as a shunt excited generator with the generated voltage producing a current which circulates through the armature itself and the power diode 23 and is in fact a form of dynamic braking with the resistance in the motor armature acting as a dynamic braking resistor. This form of braking, called plugging, is common in battery powered vehicles.

When plugging is sensed by plug logic circuit 54 an output signal is produced which closes switch 50 thereby applying a ramp function voltage reference signal to a second input terminal of comparator 34. Simultaneously, the output signal from plug logic circuit 54 back biases diode 60 and forward biases diode 58 thus switching the current limit reference from comparator 32 to comparator 34. Since upon initial application of the ramp voltage reference to comparator 34, the reference is at a very low level, the output signal from comparator 34 applied to summing junction 27 is at a very low level and causes the percent on-time of thyristor 20 to be very small. As the ramp voltage reference signal slowly increases, the percent on-time or mark-space ratio of thyristor 20 likewise increases thereby allowing a suppressed rate of increase of torque and providing a much smoother transition to full braking torque especially in the low speed region. In one particular embodiment of the invention, the magnitude of time constant used in the ramp voltage reference provides for a rate of increase to the final level in about one-half of a second. Normal stopping time for a motor from full speed to zero is about 3 to 5 seconds so that the one-half of a second interval does not provide so much delay that the current has to be increased significantly to meet the required stopping distances.

It will be seen that there has been described herein an improved dynamic braking control system which provides a controlled degree of braking and eliminates cogging caused by suddenly applied braking current limit signals which produce overshoot of armature current.

While there has been shown and described what is at present a preferred embodiment of the invention, it will be obvious to those skilled in the art that various modifications may be made without departing from the spirit and scope of the invention. It is intended therefore that the invention not be limited by the illustrated embodiment but that the appended claims be given full consideration in defining the breadth of the invention.

We claim as our invention:

1. In a control system for D-C electric traction motors of the type comprising an armature and field wherein braking torque is generated by plugging said motor by armature current flow through a circuit connected in shunt with said armature, means to regulate said braking torque comprising:
   a. means for producing a first signal representative of armature current;
   b. means for producing a reference voltage signal;
   c. means comparing said first signal and said reference voltage signal to regulate said armature current; and
   d. means for applying said reference voltage signal to said comparison means as a ramp function responsive to transition of said motor into a plugging mode.

2. The control system as defined in claim 1, wherein said means for applying said reference voltage signal comprises an integrating network.

3. The control system as defined in claim 2, wherein said integrating network comprises a resistor and a capacitor.

4. A control system for a DC electric traction motor comprising:
   means for connecting said control system to a source of DC power;
   power switching means serially connected between said motor and said source for providing time ratio control of power to said motor;
   control means connected to supply a signal to said power switching means for controlling the percentage on time of said power switching means;
   plug sensing means connected to said control system for providing a plug current limit signal during plugging of said motor;
   current limit means connected to monitor current flow in said motor and to provide a signal to said control means for limiting said current flow to a predetermined maximum, said current limit means being responsive to the presence of said plug current limit signal for restricting said motor current to a first level and being responsive to the absence of said plug current limit signal for restricting said motor current to a second level, said first and second levels being established by first and second reference voltages, respectively; and
   means for applying said first reference voltage to said current limit means as substantially a ramp function.

5. A control system as defined in claim 4, wherein said means for applying said first reference voltage comprises:
   first means for developing a reference voltage;
   integrator means connected to supply said reference voltage to said current limit means; and
   means responsive to said plug current limit signal for applying said reference voltage to said integrator means whereby said reference voltage is caused to increase from zero to a desired level in a predetermined time period.

* * * * *